United States Patent [19]
Renz

[11] Patent Number: 6,038,527
[45] Date of Patent: Mar. 14, 2000

[54] METHOD FOR GENERATING DESCRIPTORS FOR THE CLASSIFICATION OF TEXTS

[75] Inventor: Ingrid Renz, Ulm, Germany

[73] Assignee: Daimler Benz AG, Stuttgart, Germany

[21] Appl. No.: 08/809,080

[22] PCT Filed: Jun. 18, 1996

[86] PCT No.: PCT/EP96/02620

§ 371 Date: Mar. 14, 1997

§ 102(e) Date: Mar. 14, 1997

[87] PCT Pub. No.: WO97/04406

PCT Pub. Date: Feb. 6, 1997

[30] Foreign Application Priority Data

Jul. 19, 1995 [DE] Germany .................. 195 26 264

[51] Int. Cl.⁷ .................................................. G06F 17/28
[52] U.S. Cl. .................................................... 704/9
[58] Field of Search ..................... 704/1, 9; 707/500, 707/530, 531

[56] References Cited

U.S. PATENT DOCUMENTS

| | | | |
|---|---|---|---|
| 4,771,401 | 9/1988 | Kaufman et al. | 704/9 |
| 5,251,129 | 10/1993 | Jacobs et al. | 704/9 |
| 5,331,556 | 7/1994 | Black, Jr. et al. | 704/8 |
| 5,490,061 | 2/1996 | Tolin et al. | 704/2 |
| 5,745,602 | 4/1998 | Chen et al. | 704/1 |

FOREIGN PATENT DOCUMENTS

| | | | |
|---|---|---|---|
| 0281742 | 9/1988 | European Pat. Off. | G06F 17/30 |
| 0566848 | 10/1993 | European Pat. Off. | G06F 15/20 |

OTHER PUBLICATIONS

Kimbrell, Roy E., Searching for Text? Send an N–Gram! Byte vol. 13, N5, May 1988, pp. 297–312.

R. Hoch: "Using IR techniques for text classification in document analysis". In: SIGIR '94. Jul. 3–6, 1994, Dublin, Ireland, pp. 31–40.

W. Barth: "Volltextsuche mit sinnentsprechender Wortzerlegung". In: Wirtschaftsinformatik, Oct. 1990, Germany, vol. 32, No. 5, pp. 467–471.

K. Kotzias: "How to respond to different language particularities by indexing texts using automatic text analysis". In: Online Information 90, London, UK, Dec. 1990, pp. 62–68.

*Primary Examiner*—Forester W. Isen
*Assistant Examiner*—Patrick N. Edouard
*Attorney, Agent, or Firm*—Venable; George H. Spencer; Catherine M. Voorhees

[57] ABSTRACT

The proposed method for generating descriptors for the classification of texts provides a breakdown of more complex word forms by way of matching with the entirety of word forms occurring within a compilation of training texts. No morphological or linguistic knowledge base is necessary for the preferably cyclically continued breakdown, nor for the accompanying drawing up of stop word prefix and suffix lists. Simple morphological knowledge is provided by prescribing minimum requirements with respect to the form of descriptors and text sections. The method is particularly flexible and can be easily adapted to new applications. The method is also very error-tolerant and thus particularly suited for the classification of digitized texts which are produced from written texts by means of character recognition methods or from spoken texts by means of language recognition methods.

8 Claims, No Drawings

METHOD FOR GENERATING DESCRIPTORS FOR THE CLASSIFICATION OF TEXTS

BACKGROUND OF THE INVENTION

The invention relates to a method for generating descriptors for the classification of natural language texts.

The classification of a text is an assignment to a specific text class and is an important preprocessing step for the automatic further processing of texts. In particular for the automatic interpretation of texts, a preceding classification is of considerable importance because in this manner the expenditure for the knowledge base which needs to be maintained such as, e.g., dictionary memory, syntactic and semantic structure definition, can be limited considerably and the recognition performance can be greatly increased.

Text classification can be divided roughly into two steps, namely the extraction of descriptors and, based on this, the assignment to a class. The selection of the descriptors is of essential importance. The selection is a problem especially for natural language texts having a variety of word forms.

For texts in the English language, which has a small morphological variation, the use of complete word forms or phrases is proposed in "Feature Selection and Feature Extraction for Text Categorization" by D. Lewis in Proc. of Speech and Natural Language Workshop 1992. For classification tasks in morphologically richer languages, word segments can be used as descriptors, with, e.g., the text being broken down into n-grams in "N-Gram-Based Text Categorization" by Canvar/Trenkle in Proc. of Int. Symp. on Document Analysis and Information Retrieval 1994, or use of a reduction to basic forms in "Using IR Techniques for Text Classification in Document Analysis" by R. Hoch in Proc. of SIGIR, 1994.

While the n-gram breakdown results in a very large number of descriptors, the reduction to basic forms requires an expensive analysis for the preparation of the necessary knowledge base. The known procedures are also susceptible to errors in the examined texts, such as typing errors or recognition errors in the character recognition or language recognition.

SUMMARY OF THE INVENTION

It is the object of the present invention to propose a method for generating descriptors which, in a simple manner, generates an amount of descriptors suitable for the classification on the basis of training texts.

This is achieved in a method for classifying a natural language text by means of descriptors including the steps of extracting word forms during a training phase on the basis of a plurality of training texts, carrying out a breakdown of word forms occurring in the text in such a manner that longer word forms, which comprise shorter word forms occurring in the text, are broken down into the shorter word forms and optimally, remaining word segments, and forming the descriptors from the word forms and word segments which are left after the breakdown. Advantageous dependent claims comprise advantageous features and modifications of the invention will become apparent from the following description.

The special advantage of the invention is that no knowledge specifications or only simple knowledge specifications are needed and that the method can thus be used easily for new applications. An advantageous embodiment, for example, provides a morphologically based limitation with respect to the word segments developing during the breakdown as a simple knowledge specification. The method according to the invention also specifically considers significant spelling errors or recognition errors in relevant descriptors on the assumption that such errors will likewise occur in the training texts and in the texts which are to be classified later.

Preferably, the breakdown is carried out repeatedly, with the word segments remaining in an occupation cycle being treated like word forms in the following breakdown cycle. The word forms and word segments obtained after the breakdown, optionally multiple breakdown, may still contain different variants of simpler basic forms produced through inflection or affixes. By separating prefixes and suffixes (including inflectional forms), the variety of word forms can be reduced further, i.e., the number of descriptors can be reduced. From the word forms of the training texts, the prefixes and suffixes are preferably defined statistically as frequently occurring and thus not very distinctive beginnings and endings of words.

A specification of so-called stop words is also of particular advantage. These are understood to be very frequently occurring word forms which are not very distinctive such as, e.g., definite and indefinite articles, prepositions, pronouns, conjunctions, etc. Preferably, such stop words are determined from the training texts by means of statistical methods as being word forms which occur with particular frequency. Alternatively or additionally, the stop words can also be predetermined entirely or partially independently of the training texts. During the generation of the descriptors, the stop words are not considered from the outset, which means, in particular, that they are not considered to be word forms during the breakdown.

In order to simplify the classifier, the list of descriptors can be limited to those descriptors whose frequency exceeds a predetermined frequency threshold in the training texts.

Advantageously, the texts are already limited to applications such as, e.g., business letters, economic news reports, scientific reports, etc. The business letters application may then differentiate between text classes such as, e.g., orders, bids, invoices, etc.

In the following, the invention is illustrated in greater detail by means of texts that are digitized by scanning written documents by means of optical character recognition systems (OCR).

DETAILED DESCRIPTION OF THE INVENTION

From the documents of a compilation of, e.g., 600 training texts, all occurring word forms including their frequency are determined in the entirety of the training texts. The most frequently occurring word forms are incorporated as stop words into a stop word list. For example, the stop word list is drawn up with the 100–300 word forms which are most frequently represented in the compilation of training texts. Because of the purely statistical approach of the derivation from the training texts, the stop word list generated in this manner is specific for the language and subject area of the training texts. In particular, it also contains OCR-typical errors as stop word variants such as, e.g., "dio" in addition to "die" [the] or "fiir" in addition to "für" [for]. Because of the statistical approach, distinctive word forms occurring very frequently can also be identified as stop words which are then no longer available for the classification. Instead of the specification of a number of stop words for drawing up the stop word list, a threshold for a relative minimum frequency or, particularly for compilations of training texts of a smaller scope, an upper limit, for example, 1.5% of all word forms occurring in the training texts, can be predetermined for the magnitude of the stop word list. Additionally or alternatively, stop words, e.g., articles, prepositions, etc., can also be fixedly predetermined. Only those word forms are then considered for the further processing which are not comprised in the stop word list.

Especially because of character recognition errors in the digitization of texts, character combinations may appear which are not suitable as descriptors. It is therefore meaningful to predetermine minimum requirements for the structure of the descriptors. Particularly advantageous are requirements such as a descriptor must comprise at least 3 letters a descriptor must contain at least one vowel, wherein, in turn, a letter in this sense can also be a hyphen and character groups such as qu, ch, ie, ph.

Character groups in the text which are present before or after the exclusion of stop words and which do not meet these minimum requirements cannot become suitable detectors, not even by means of the processing steps of the method according to the invention described below, but they might lead to unusable results during the breakdown of complex word forms. Individual characters or character groups in the text which do not meet these minimum requirements are therefore not considered for the further processing.

By means of statistical methods, frequently occurring beginnings (prefixes) and endings (suffixes) of words are determined from the word forms which are to be processed further, and they are entered into lists as prefixes and suffixes that are not very distinctive. The derivation of such prefixes and suffixes is prior art and is known, e.g., from "Experimentelle Morphologie in der Informationswissenschaft" [Experimental Morphology in Information Science], Munich 1977, by R. Kuhlen. In this context, inflectional forms are also included in the suffixes.

The breakdown of word forms, which is essential for the invention, is carried out on the basis of the remaining text portions. The main goal is the extraction of a number of descriptors distinctive for the classification, which number is reduced compared to the number of the different word forms. It is examined during the breakdown whether shorter word forms are comprised in longer word forms. If this is the case, a longer word form is broken down into the shorter word form contained therein and at least one remaining word segment. Preferably, it is also examined whether a word segment is generated during the breakdown which is not suitable as a descriptor, for example, by using the same minimum requirements as a basis that were mentioned above. A breakdown which would result in a word segment that is unsuitable in this sense is not carried out; the longer word form is maintained. A word segment which remains after an admissible breakdown may be identical to a word form which already exists or is incorporated as a new word form and included in the cyclically progressing matching of the word forms. The matching is preferably continued until a further breakdown is no longer possible.

The beginning and ending character sequences comprised in the prefix and suffix lists are separated from the word forms and word segments present after the breakdown. In this manner, mainly different variation forms of root words can be reduced to their word stem and be combined therein. For the separation of prefixes and suffixes, a frame is also set advantageously for admissible separations by predetermining minimum requirements with respect to the word segments remaining after the separation, e.g., the descriptor restrictions mentioned for the initial exclusion of unsuitable character sequences. The character sequences (word forms and word segments) that are left after breakdown and separation are considered to be suitable descriptors and are used further. The separation of prefixes and suffixes does not have to be limited to the method phase after the completion of all breakdowns, rather it can also be carried out alternatively or additionally in intermediate stages. The reduction of the word forms by way of breakdown or separation does not require any morphological knowledge or with the specification of minimum requirements only very simple morphological knowledge. This means that in the grammatical sense, faulty analyses and separations are admissible and, as a rule, do occur. Therefore, a word stem is often no longer recognizable in the word forms or word segments that are left. They can also again assume the form of initially excluded stop words. These word truncations are also equally suited as descriptors since they are specific for the text types forming the training texts by virtue of their derivation from the training texts and since they function in the same manner for the training of the classifier as well as for the classification of unknown texts.

The expenditure for the classifier can be further reduced considerably by predetermining a threshold value for the frequency of the descriptors which were determined in the above-described manner and by continuing the use of only those descriptors for the classifier whose frequency of occurrence reaches or exceeds the threshold value. The threshold value can be predetermined so as to be fixed, e.g., with frequency 4, or relative, or it may be determined indirectly with the proviso that only a specific number or a specific percentage of the descriptors be elected which occur most frequently in the training texts.

The invention is not limited to the embodiments according to the above-mentioned detailed explanations. Within the framework of the invention, an expert skilled in the art can make modifications based on his or her expert knowledge. Especially the parameters for the statistical compilation of the stop word list and of the prefix and suffix lists as well as for the specification of the minimum requirements with respect to the descriptors can be changed and thus allow a further optimization of the method to a limited extent by setting these parameters according to the conditions of special applications. Furthermore, the invention can also be used in combination with known methods for the generation of descriptors. The texts must not be available as written documents but they may also be spoken or electronically transmitted texts.

The list of descriptors whose use should be continued and the stop word list form the basis for the subsequent text classification in the training phase of the classifier as well as in the classification of unknown texts. Classifiers are generally known from the prior art.

For this purpose, all stop words are cancelled in the texts to be classified or remain unconsidered for the further procedure by matching them with the stop word list. The text in which the stop words were omitted is compared with the descriptor list. In this process, e.g., all word forms containing descriptors as word segments are replaced by the respective descriptors. Word forms which cannot be replaced by descriptors are also cancelled. This results in descriptor texts which are unintelligible for humans but very well suited for the classifier. These descriptor texts or statistical statements gained from them regarding the occurrence of descriptors are used for the actual classification.

An equivalent procedure after the cancellation of the stop words in the text to be classified is, e.g., the search through a text on the basis of the descriptor list and the statistical detection of the frequency of occurrence or only the presence of individual descriptors. For the classifier, a plurality of suitable features are known from the prior art. Advantageously, the descriptors generated according to the invention are especially suited for the comparatively low-expenditure statistical classification methods.

In the following, the invention is described in still greater detail by way of two examples. For a first example of a compilation of training texts having a small scope, which is a construed example for the sake of clarity, a short list of word forms still contained in the training texts is used as a basis glasfaser-lichtleitern [glass-fiber light guides]
    rechnerkerns [computer core]
    halbleitern [semiconductors]
    halbleiters [semiconductor]
    glaskerns [glass core]
    rechner [computer]
    leiters [conductor]

after the cancellation of stop words and of character sequences which do not meet the minimum requirements (1 vowel, 3 letters) already mentioned above by way of example. It is assumed that from these not prefixes but suffixes s, n, ter, er are derived in a manner known per se which are deposited in a suffix list.

In cyclically repeated breakdown steps, a matching within the valid word form list is carried out in the sense that a longer word form containing one (or several) shorter word forms is subdivided into this shorter word form and one or several remaining word segments provided that the remaining word segments also meet the minimum requirements. These remaining word segments are treated as new word forms for the further processing steps. After a first breakdown step, the following new word form list results:

glasfaser-lichtleitern [glass-fiber light guides]
    halbleitern [semiconductors]
    glaskerns [glass core]
    leiters [conductor]
    rechner [computer]
    kerns [core]
    halb [half]

The possibility of a further breakdown is examined again and, following the second breakdown step, the following word form list results glasfaser-lichtleitern [glass fiber light guides]
    leitern [conductors]
    leiters [conductor]
    rechner [computer]
    kerns [core]
    halb [half]
    glas [glass]

Correspondingly, following the third breakdown step
    leitern [conductors]
    leiters [conductor]
    rechner [computer]
    faser [fiber]
    kerns [core]
    licht [light]
    halb [half]
    glas [glass]

These word forms cannot be further broken down by matching so that the cyclical breakdown is completed. The suffix forms deposited in the suffix list are separated successively from these word forms, again while complying with the above-cited minimum requirements, so that the following are left as descriptors lei (26)
    halb (18) [half]
    rechn (2)
    fas (2)
    gla (2)
    ker (2)
    licht (1), [light]

with the numbers in parenthesis indicating the frequency of the individual descriptors in the entirety of the training texts. If, as a minimum frequency for distinctive descriptors, a twofold occurrence is prescribed, the descriptor "licht" occurring only once is not used further for the classification.

A second example, taken from an actual case, which example illustrates the reduction of an unknown text to be classified by way of a descriptor list previously determined from a compilation of training texts, is based on an excerpt from a text of a short scientific report which was digitized by means of OCR:

Es werden Versuche beschrieben, durch Mischungen eines Bleiglase; mit Ti 02 in untersch ied 7 i chen Verh äl tn i ssen sowi e durch E i nsatz verscsSI i edener PbO-Tio-Sio-Al o-Systeme zu Siebdruckpasten mit auskristal tisierbaren z 2 2 3 dielektrischen Komponenten zu gelangen. Neben der Erprobung der.

The digitized text is full of recognition errors which were produced during the OCR processing. First, the stop words comprised in a stop word list (such as, e.g., "es" [it], "werden" [will], "beschrieben" [described], "durch" [by means of], "eines" [of a], "mit" [with], etc.) are cancelled in the usual manner. The cancellation of the character sequences not meeting the minimum requirement for descriptors is advisable but not imperative. Then, the text is reduced to the descriptors contained therein by a simple comparison of character sequences. The descriptor list determined in this actual example is not indicated here in detail because of its scope and lack of descriptiveness.

A resulting descriptor text
    such misch blei las hal sen atz ssi tio sio ystem sieb pas kri tis bar diel tri mpo ent gel neb bur no longer makes sense to a human observer but suffices for the automatic classification.

While, in the first example, which was construed for the sake of clarity, the descriptors still bear some resemblance to the underlying word stems, the descriptors often seem to not bear any relation to content in the actual case. This clarifies the difference between the substantially statistical procedure which is advantageous for automatic processing compared to a text analysis on a linguistic knowledge base. The ability to also classify texts containing many errors, as in the example specified above, illustrates the high error tolerance of the method according to the invention.

What is claimed is:

1. A method of generating descriptors for natural language texts, using a plurality of training texts having a plurality of words, comprising the steps of:

extracting words from a text during a training phase on the basis of the training texts;

predetermining a minimum structure of said descriptors;

breaking down words in the text into shorter word segments, wherein each shorter word segment within a longer word segment must meet said minimum structure for said breaking down to be permitted; and matching said word segments that remain in the text against each other to generate a list of descriptors.

2. A method according to claim 1 wherein the breakdown step is carried out repeatedly, with the word segments formed in preceding breakdown cycles being treated like word forms that occur in the text, and the descriptors are formed from the word forms and word segments which are left after the last breakdown cycle.

3. A method according to claim 1 wherein, during the formation of the descriptors from the remaining word forms and word segments, suffixes and prefixes are separated from them.

4. A method according to claim 3, wherein the suffixes and prefixes are statistically determined from the word forms occurring in the training texts.

5. A method according to claim 1, wherein a stop word list is predetermined and word forms contained therein are not considered in the text.

6. A method according to claim 5, wherein the word forms of the stop word list are statistically determined from the training texts as the word forms which most frequently occur therein.

7. A method according to claim 1, wherein a frequency threshold is predetermined for the descriptors and only those descriptors are used whose frequency in the training texts exceeds the threshold.

8. The method according to claim 4, comprising the following steps:

removing word segments not meeting the minimum structure from consideration as descriptors, wherein the minimum structure includes word segments having at least three characters, one of which must be a vowel; and separating said prefixes and suffixes from said word segments at a conclusion of said breaking down step.

* * * * *